(12) United States Patent
Hiroshige et al.

(10) Patent No.: US 7,862,080 B2
(45) Date of Patent: Jan. 4, 2011

(54) VEHICLE AIRBELT APPARATUS

(75) Inventors: Atsushi Hiroshige, Okazaki (JP); Yoji Suyama, Tokyo (JP)

(73) Assignees: Toyota Jidosha KK, Toyota-shi (JP); Takata Corporation, Tokyo (JP)

( * ) Notice: Subject to any disclaimer, the term of this patent is extended or adjusted under 35 U.S.C. 154(b) by 489 days.

(21) Appl. No.: 11/703,766

(22) Filed: Feb. 8, 2007

(65) Prior Publication Data

US 2007/0182137 A1    Aug. 9, 2007

(30) Foreign Application Priority Data

Feb. 9, 2006    (JP)    ................ 2006-032054

(51) Int. Cl.
*B60R 21/18*    (2006.01)
(52) U.S. Cl. .................................... 280/733
(58) Field of Classification Search ............ 280/733, 280/730.1
See application file for complete search history.

(56) References Cited

U.S. PATENT DOCUMENTS

| | | | | |
|---|---|---|---|---|
| 5,393,091 A | * | 2/1995 | Tanaka et al. ............ | 280/733 |
| 6,279,945 B1 | * | 8/2001 | Schneider et al. ......... | 280/733 |
| 6,511,093 B2 | * | 1/2003 | Buerkle et al. ............ | 280/729 |
| 2002/0171233 A1 | * | 11/2002 | Grace ...................... | 280/733 |
| 2010/0164207 A1 | * | 7/2010 | Sekizuka et al. .......... | 280/733 |

FOREIGN PATENT DOCUMENTS

| | | |
|---|---|---|
| DE | 199 50 951 A1 | 4/2001 |
| JP | 3113081 | 9/2000 |
| JP | 2001-239906 | 9/2001 |
| WO | WO 00/21798 | 4/2000 |

* cited by examiner

*Primary Examiner*—Faye M. Fleming
(74) *Attorney, Agent, or Firm*—Foley & Lardner LLP

(57) ABSTRACT

An inflatable member is restricted to expand outwardly in the vehicle width direction and allowed to expand upwardly to a position facing a side of an occupant's head when a lateral collision occurs. A belt guide mounted on the shoulder portion of a seat back guides a restraint webbing, including an inflatable member that is provided for supporting the head of a vehicle occupant when inflated, and allows a guide hole to be vertically enlarged by being projected upwardly in the vehicle vertical direction when the inflatable member is inflated. The inflatable member is thereby expanded so as to form a vertically extended shape regulated by the guide hole and disposed to an upward position facing the side of the occupant's head when a lateral collision occurs.

9 Claims, 3 Drawing Sheets

FIG. 1A
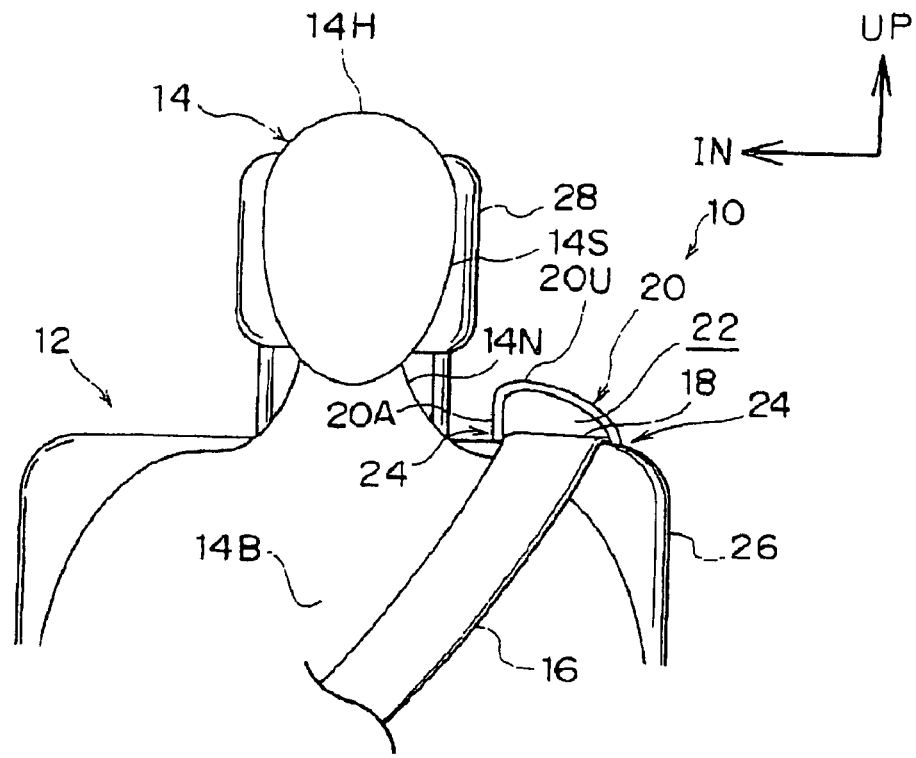
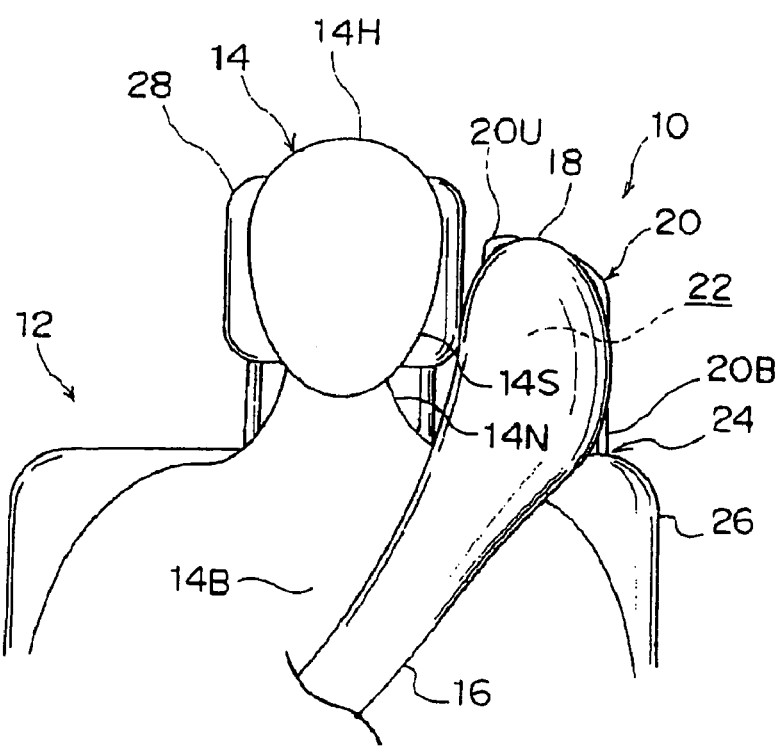
FIG. 1B

VEHICLE AIRBELT APPARATUS

BACKGROUND

The present invention relates to a vehicle airbelt apparatus having an inflatable member that is disposed for supporting the head of a vehicle occupant when inflated.

PCT Japanese Translation Patent Publication No. 2002-527282 (which is incorporated by reference herein in its entirety) is an example of a vehicle airbelt apparatus in which an occupant restraint webbing having an inflatable member is threaded through a belt guide disposed on a shoulder portion of a seat back, and the inflatable member is inflated by an inflator fixed to the seat back frame.

SUMMARY

One embodiment relates to a vehicle airbelt apparatus. The airbelt apparatus comprises an occupant restraint webbing to support a chest of an occupant seated in a vehicle seat, and an inflatable member to support a head of the occupant when inflated. The inflatable member being included in the occupant restraint webbing. The apparatus also includes an inflator to supply inflation gas to the inflatable member, a lateral-collision sensor for detecting or predicting a lateral collision, a control device to activate the inflator according to an output signal from the lateral-collision sensor, and a belt guide mounted on a shoulder portion of a seat back of the vehicle seat. The belt guide constitutes a guide hole to guide the occupant restraint webbing. The guide hole is increased in size in a vehicle vertical direction due to the belt guide being projected a predetermined length by inflating force during inflation of the inflatable member.

Another embodiment relates to a belt guide for an airbelt. The belt guide is mounted to a shoulder portion of a vehicle seat back. The belt guide comprises a guide hole, and first and second leg members. The leg members are substantially parallel to each other in a vehicle width direction. A space is between the first leg member and the second leg member. The belt guide is projected a predetermined length due to inflation of the airbelt. The guide hole is increased in size in a vehicle vertical direction when the belt is being projected.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1A is a front view showing an occupant restraint webbing guided by a belt guide when an occupant seated in a vehicle seat wears the occupant restraint webbing in normal usage.

FIG. 1B is a front view showing an inflatable member expanded in a vertically extended shape and facing a side of the occupant's head when a lateral collision occurs; the shape of the expanded inflatable member is formed by the vertically enlarged guide hole of the belt guide, which is projected by the inflating force of the inflatable member.

DETAILED DESCRIPTION

Figure 2A:
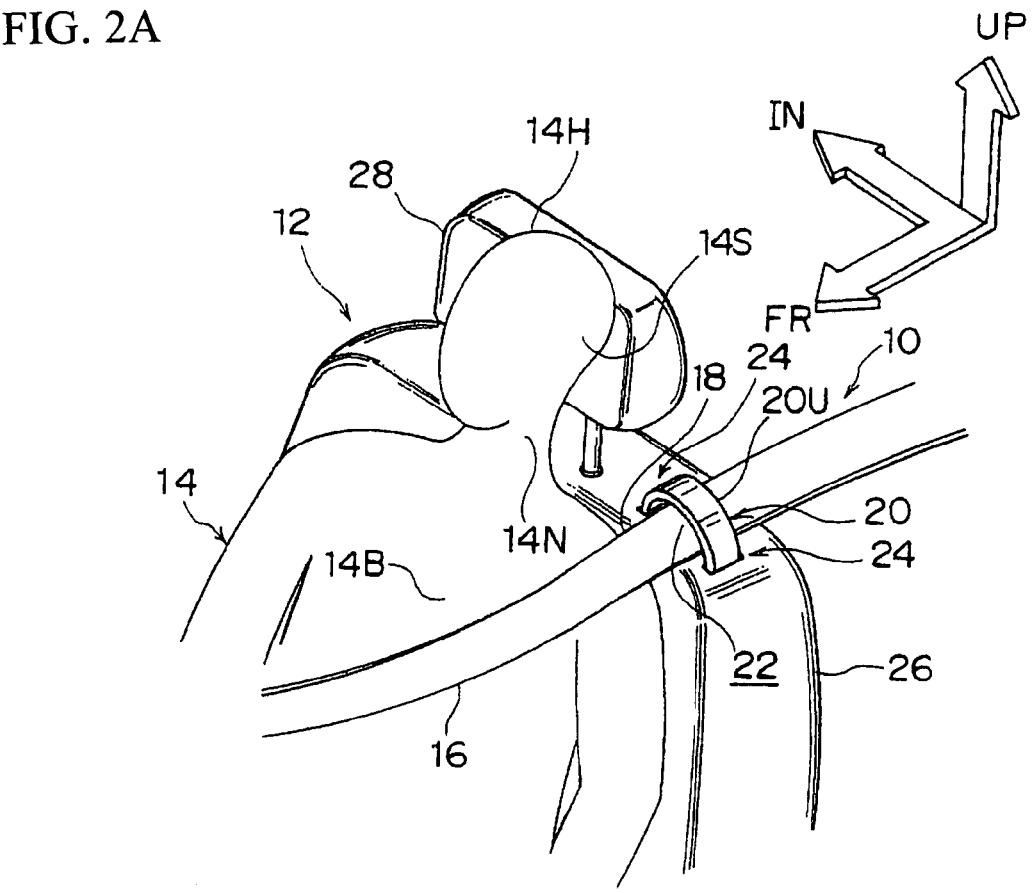
FIG. 2A is a perspective view showing an occupant restraint webbing guided by a belt guide when an occupant seated in a vehicle seat wears the occupant restraint webbing in normal usage.

The conventional vehicle airbelt apparatus may not have an inflatable member of the webbing that is disposed so as to support the side of an occupant's head when a lateral collision occurs, since the inflatable member expands toward the occupant's body due to the webbing's tension increasing as it inflates, and also since the inflatable member expands laterally, i.e., in the vehicle width direction, due to the shape of the belt guide that is oblongly formed to conform to the profile of the occupant restraint webbing.

An object of exemplary embodiments is to enable an inflatable member of an occupant restraint webbing to expand upwardly for supporting the side of an occupant's head by restricting it from expanding outwardly in the vehicle width direction when inflated in the event of a lateral collision.

A first embodiment includes occupant restraint webbing for supporting the chest of an occupant seated in a vehicle seat, an inflatable member incorporated in the webbing for supporting the occupant's head, an inflator being ready to supply the inflatable member with an expansion gas, a lateral-collision sensor for detecting or predicting a lateral collision, a control device for activating the inflator according to an output signal from the lateral-collision sensor, and a belt guide that is disposed on a shoulder portion of the vehicle seat back, constituting a guide hole for guiding the occupant restraint webbing; the belt guide can be projected a predetermined length by the inflating force of the inflatable member when it inflates, to make the area of the guide hole increased in the vertical direction.

In the vehicle airbelt apparatus of the first embodiment, while normally used, the occupant restraint webbing is guided through the guide hole of the belt guide. When a lateral collision on the vehicle occupant side is detected or predicted by the lateral-collision sensor, the inflator is activated to cause blowing out a large quantity of the gas, which expands the inflatable member. At that time, due to the inflating force of the inflatable member, the belt guide is projected a predetermined length, and the area of the guide hole is thereby increased in the vehicle vertical direction. Because the area of the guide hole is thus increased, the expanded inflatable member is constrained at the shoulder portion of the seat back so as to have a vertically long cross-sectional shape, and therefore it expands upwardly along the side of the occupant's head. In this manner, the vehicle airbelt apparatus can restrict the inflatable member from inflating outwardly in the vehicle width direction when it inflates in the event of a lateral collision, and allows the inflatable member to expand to an upward position facing to the side of the occupant's head.

A second exemplary embodiment includes a belt guide that has leg members extending along the direction in which the belt guide is projected, which are disposed substantially in parallel with the vehicle width direction with a space between each other, and supported by a guide member so as to be slidable in the direction in which the belt guide is projected until being blocked by a stopper, the guide member being mounted in the seat back.

In the vehicle airbelt apparatus described in the second embodiment, the leg members, which are disposed substantially in parallel with the vehicle width direction with a space between each other, are supported so as to be slidable by the guide member mounted in the seat back, and can be smoothly projected in the vehicle upward direction by the inflating force of the inflatable member when it inflates. Furthermore, because the projection of the belt guide is restricted at a predetermined length by the stopper, the inflatable member can be expanded to an appropriate position.

A third exemplary embodiment of a vehicle airbelt apparatus includes a projection restricting mechanism that keeps the belt guide in the depressed position while normally used, and allows it to be projected when the inflatable member inflates.

In the vehicle airbelt apparatus described in the third embodiment, the belt guide can stably guide the occupant restraint webbing in the same manner as a conventional belt guide while normally used, since the projection restricting mechanism restricts the projection of the belt guide. On the other hand, when the inflatable member inflates, the belt guide is allowed to be projected and the area of the guide hole is accordingly increased in the vehicle vertical direction; the inflatable member is thereby constrained so as to expand to an upward position facing to the side of the occupant's head.

As described above, the vehicle airbelt apparatus of the first embodiment can restrict the inflatable member of the occupant restraint webbing from inflating outwardly in the vehicle width direction, and can expand to an upward position facing to the side of the occupant's head when it inflates in the event of a lateral collision.

The vehicle airbelt apparatus of the second embodiment can smoothly project upwardly the belt guide by the inflating force of the inflatable member as it inflates, by which the inflatable member can expand to an appropriate position.

The vehicle airbelt apparatus of the third embodiment includes a belt guide that can stably guide the occupant restraint webbing in the same manner as a conventional belt guide while normally used, and can enable the inflatable member to expand to an upward position facing to the side of the occupant's head when it inflates.

An exemplary embodiment will be described with reference to the drawings below. In FIGS. 1A and 2A, a vehicle airbelt apparatus 10 in accordance with this embodiment constitutes a type of seat belt for restraining an occupant 14 seated in a vehicle seat 12, and includes an occupant restraint webbing 16, an inflatable member 18, an inflator (not shown), a lateral-collision sensor (not shown), a control device (not shown), and a belt guide 20.

The vehicle seat 12 includes a seat cushion (not shown) on which the occupant 14 sits, a seat back 26 for supporting the back of the occupant 14, and a headrest 28 for supporting the head 14H of the occupant 14, the headrest being mounted on the seat back 26.

A lap belt anchor (not shown) is disposed at the side portion of the seat cushion on the outer side of a compartment, and a buckle device (not shown) is disposed at the side portion of the seat cushion near the center of the compartment. The positions for disposing the lap belt anchor and buckle device are not limited to the seat cushion; they may be disposed at a floor panel side, for example. A gas source, such as the inflator (not shown), for supplying gas to the inflatable member 18 is installed inside or outside of the buckle device. The control device activates the inflator when a lateral collision is detected by the lateral-collision sensor, or when it is predicted by a pre-crash sensor (not shown).

If it is desired that the inflatable member 18 is also disposed so as to support the chest 14B of the occupant 14, the inflator can be inflated when a frontal collision is detected or predicted. Here, respective inflators to be activated by a lateral collision or a frontal collision may be used, or an inflator having a function of selectively supplying the gas may also be used.

The occupant restraint webbing 16 is a belt-like member provided for supporting the chest 14B of the occupant 14, and is structured so as to be retracted by a retractor (not shown) installed, for example, in the vehicle upper back panel. When the occupant 14 wears the webbing, it can be withdrawn from the retractor to conform to the body size of the occupant 14; then, as shown in FIGS. 1A and 2A, the positioning of the occupant restraint webbing 16 is regulated by the guide hole 22 that is constituted by the belt guide 20 under normal conditions of use.

A tongue plate (not shown), which is composed so as to be insertable into the buckle device, is incorporated in the occupant restraint webbing 16, and enables the gas in the inflator to be supplied to the inflatable member 18 when inserted into the buckle device.

Figure 3:
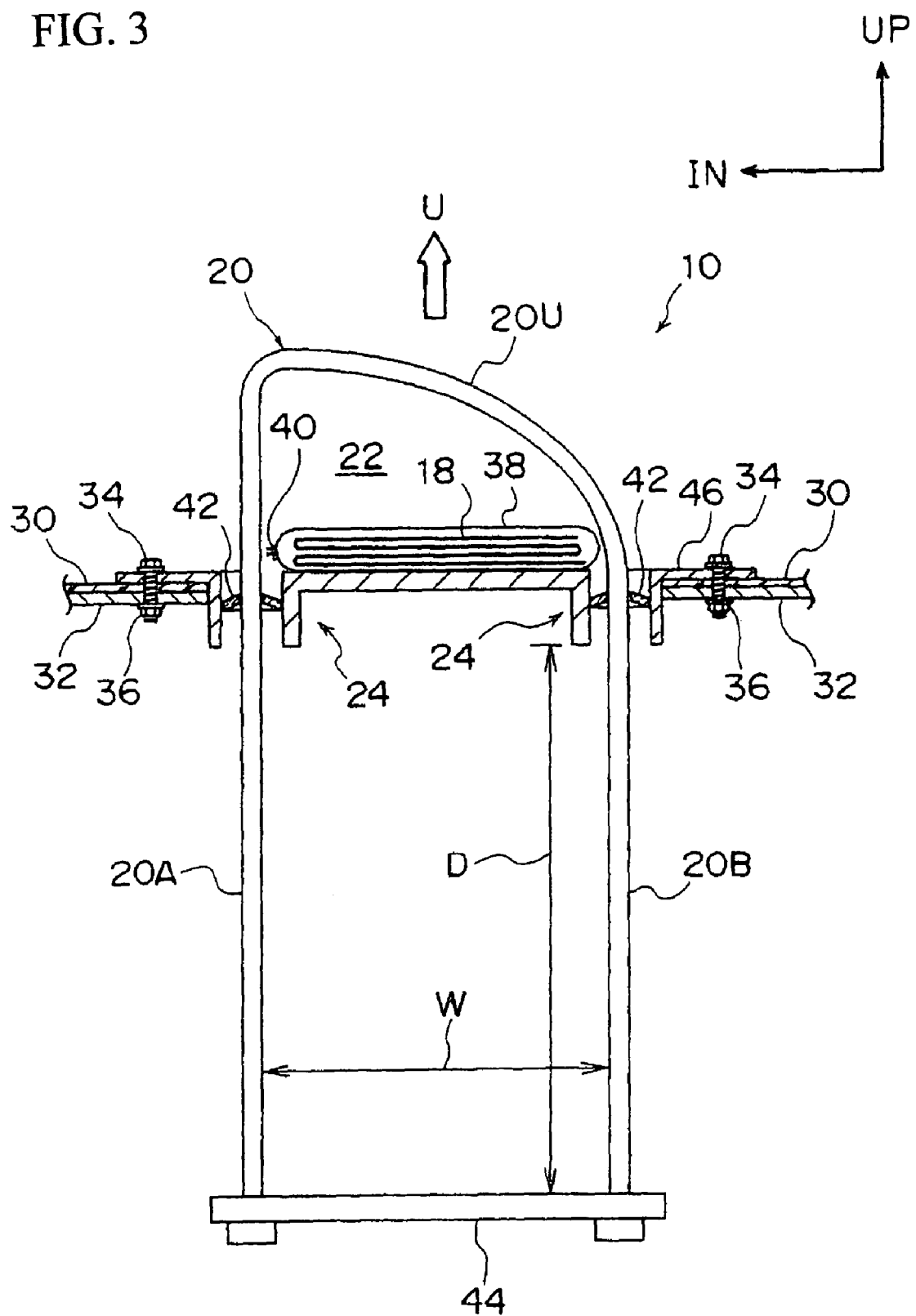
FIG. 3 is an enlarged cross-sectional view showing the structure of the belt guide and support members disposed on the shoulder portion of the seat back.

The inflatable member 18 included in the occupant restraint webbing 16 is a folded bag provided for supporting the head 14H of the occupant 14 when it inflates. Specifically, as shown in FIG. 3, the inflatable member 18 is folded into a belt having the same shape as the occupant restraint webbing 16, and is covered, for example, by stretchable mesh webbing (not shown); furthermore, it is covered with a cover 38 and sewn up in a belt shape. Then, the edge of the folded inflatable member on the seat center side is sewn in a controlled method of sewing, so-called a tear sewing 40, that allows it to rupture when the pressure in the inflatable member 18 exceeds a certain value, so that it expands at an early stage in the area close to the head 14H of the occupant 14. The expansion area of the inflatable member 18 is not limited to the position for supporting the head 14H of the occupant 14, but may be extended to the position for supporting the chest 14B.

In FIGS. 1A and 2A, the belt guide 20, mounted on the shoulder portion of the seat back 26 of the vehicle seat 12, constitutes the guide hole 22 for guiding the occupant restraint webbing 16, and can be projected a predetermined length by the inflating force of the inflatable member 18 when it inflates; the area of the guide hole 22 is thereby increased in the vehicle vertical direction. Specifically, the belt guide 20 has leg members 20A and 20B extending along the direction in which the belt guide is projected, which are disposed substantially in parallel with the vehicle width direction with a space between each other, and supported by a guide member 24 mounted in the seat back 26 so as to be slidable in the direction in which the belt guide 20 is projected.

An upper edge 20U of the belt guide 20 is exposed from the seat back 26 even while normally used, and the guide hole 22 is thereby formed on the shoulder portion of the seat back 26. Furthermore, since the upper edge 20U of the belt guide 20 is formed, for example, so as to be inclined upwardly as seen from the side of the vehicle toward the center of the seat, when the belt guide 20 is projected due to the expansion of the inflatable member 18 as shown in FIG. 1B, the height of the guide hole 22 on the seat center side becomes larger than the height of the guide hole 22 on the other side, which allows the inflatable member 18 to expand more broadly at the area close to the head 14H in the vehicle vertical direction.

As shown in FIG. 3, the guide member 24 is integrated in a base 46 that is mounted, for example, on the shoulder portion of the seat back 26, the base 46 being fixed to a seat back frame 32 with a sheet trim 30 sandwiched in between, for example, by using bolts 34 and nuts 36. Specifically, the guide member 24 is fabricated so that the leg members 20A and 20B of the belt guide 20 are respectively inserted, and O-rings 42 are disposed in the guide member 24 as a projection restricting mechanism to restrict the belt guide 20 from being projected. The O-rings 42 restrict the belt guide 20 from being projected by applying friction to the leg members 20A and 20B.

Note that the projection restricting mechanism is not limited to the O-rings 42; the belt guide 20 may also be restricted from being projected by use of stopper pins, spring-loaded steel balls, or the like (not shown) by which the leg members 20A and 20B are held in place, allowing the belt guide 20 to function under normal conditions of use. If the stopper pins or the like are used, the fixture using the stopper pins or the like should be structured so as to be unlocked when the inflatable member 18 inflates.

At the lower end of the belt guide 20, for example, a stopper 44 is provided to prevent the belt guide 20 from being projected beyond the predetermined length. The stopper 44 is a plate-like member disposed in the vehicle width direction, for example, so as to couple the lower ends of the leg members 20A and 20B to each other. The belt guide 20 can be projected until the stopper 44 comes into contact with the lower end of the guide member 24. Namely, the predetermined projection length (maximum projection length) of the belt guide 20 is set by the distance D between the guide member 24 and the stopper 44. On the other hand, the guide hole 22 needs to be of a vertically long shape in order to constrain the inflatable member 18 so as to have a cross-sectional shape that extends in the vehicle vertical direction when it inflates. Therefore, the maximum projection length of the belt guide 20 is set, for example, so as to be larger than the distance W between the leg members 20A and 20B in the vehicle width direction.

The structure of the stopper 44 is not limited to that shown in the drawing. The shape of the belt guide 20 is also not limited to that shown in the drawing; any shape can be employed for the belt guide 20 as long as it is possible to form the inflatable member 18 in a vertically long cross-sectional shape when the inflatable member 18 inflates.

In the vehicle airbelt apparatus 10 shown in FIGS. 1A and 2A, the leg members 20A and 20B of the belt guide 20 are mostly retracted inside the seat back 26 when the inflatable member 18 is not inflated, i.e. when normally used, and constrained by the O-rings 42 not to be projected (FIG. 3); thereby, the guide hole 22 formed between the upper edge 20U of the belt guide and the shoulder portion of the seat back 26 can guide the occupant restraint webbing 16 so as to stably regulate the positioning.

Figure 2B:
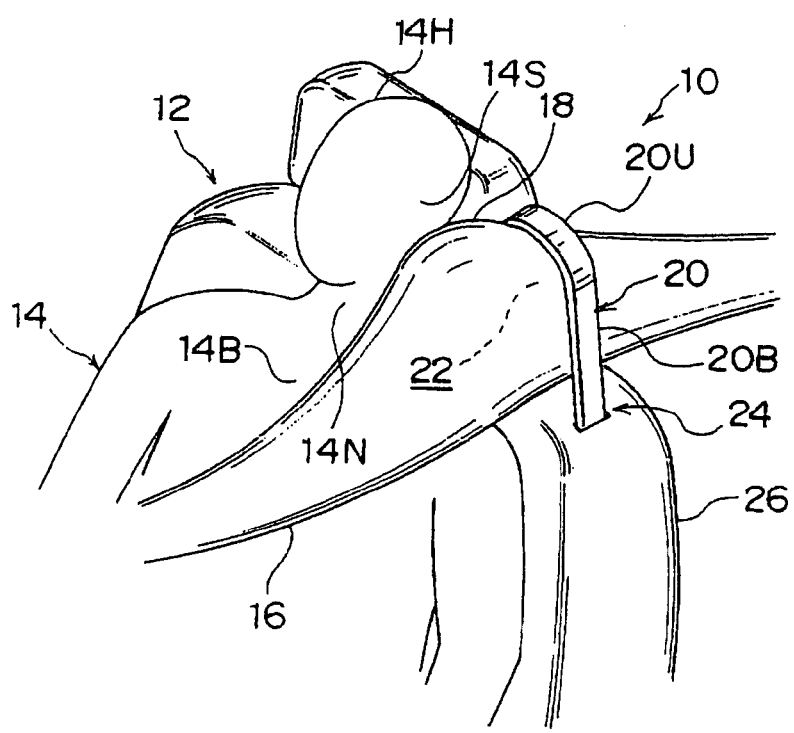
FIG. 2B is a perspective view showing an inflatable member expanded in a vertically extended shape and facing a side of the occupant's head when a lateral collision occurs; the shape of the expanded inflatable member is formed by the vertically enlarged guide hole of the belt guide, which is projected by the inflating force of the inflatable member.

When a lateral collision on the vehicle occupant side occurs, or such a lateral collision is predicted in the situation that the occupant restraint webbing 16 is worn, the inflator is activated to spout a large quantity of gas, which is supplied to the inflatable member 18, and allows it to expand as shown in FIGS. 1B and 2B. Then, in FIG. 3, the inflating force of the inflatable member 18 acts as a force to project the belt guide 20, and overcomes the static friction force arising between the O-rings 42 and each of leg members 20A and 20B. As a result, the static friction force changes to a dynamic friction force that releases the belt guide 20 from restriction by the O-rings 42. The belt guide 20 can be thereby projected smoothly in the vehicle upward direction, i.e. in the direction of the arrow U as it is guided by the guide member 24. When the belt guide 20 is projected the predetermined length, i.e. the distance D between the guide member 24 and the stopper 44, the stopper 44 comes into contact with the lower end of the guide member 24 and its further projection is prevented.

Because the projected length of the belt guide 20 is thus restricted by the stopper 44, the area of the guide hole 22 can be appropriately increased in the vehicle vertical direction, and the inflatable member can be thereby constrained at the shoulder portion of the seat back 26 so as to have a vertically long cross-sectional shape. The inflatable member 18 is thereby restricted to expand outwardly in the vehicle width direction, and enabled to upwardly expand to the position facing a side of the head 14S of the occupant 14 when inflated.

Furthermore, since the upper edge 20U of the belt guide 20 is formed so as to be inclined upwardly as seen from the side of the vehicle toward the center of the seat, the inflatable member 18 is enabled to expand more broadly in the vehicle vertical direction at the area close to the head 14H; the broad covering area, for example, from the cervix 14N to the head 14H serves to absorb the inertial force of the head 14H and the like in the vehicle width direction.

In addition, the expanded volume of the inflatable member 18 can be specified to be relatively small, since the enlarged guide hole 22 of the belt guide 20 restricts the inflatable member 18 from inflating outwardly in the vehicle width direction, and regulates it so as to have a cross-sectional shape that extends in the vehicle vertical direction; therefore, the folded thickness of the inflatable member 18 can be lessened, which leads to ease of use for the occupant restraint webbing 16 when normally used.

The Japanese Priority Application 2006-032054 filed Feb. 9, 2006, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A vehicle airbelt apparatus comprising:
   an occupant restraint webbing to support a chest of an occupant seated in a vehicle seat;
   an inflatable member to support a head of the occupant when inflated, the inflatable member being included in the occupant restraint webbing;
   an inflator to supply inflation gas to the inflatable member;
   a lateral-collision sensor for detecting or predicting a lateral collision;
   a control device to activate the inflator according to an output signal from the lateral-collision sensor; and
   a belt guide, mounted to a shoulder portion of a vehicle seat back, the belt guide comprising a guide hole and first and second leg members, the leg members being substantially parallel to each other in a vehicle width direction, with a space between the first leg member and the second leg member,
   wherein the belt guide is projected a predetermined length due to inflation of the airbelt, and wherein the guide hole is increased in size in a vehicle vertical direction when the belt is being projected, and wherein the predetermined length of the belt guide is larger than a distance between the first and second leg members in the vehicle width direction.

2. The vehicle airbelt apparatus according to claim 1,
wherein the belt guide leg members extend along a direction in which the belt guide is projected,
wherein the belt guide is supported by a guide member mounted in the seat back so as to be slidable in the direction in which the belt guide is projected, and
wherein a stopper restricts the projection of the belt guide from exceeding the predetermined length.

3. The vehicle airbelt apparatus according to claim 2, wherein the stopper includes a plate member disposed in the vehicle width direction, and the stopper couples together lower ends of the leg members to each other.

4. The vehicle airbelt apparatus according to claim 3, wherein an upper edge of the belt guide is formed to be inclined upwardly as seen from a side of a vehicle toward a center of the vehicle seat.

5. The vehicle airbelt apparatus according to claim 1, further comprising a projection restricting mechanism that prevents the belt guide from being projected in normal use and allows the belt guide to be projected when the inflatable member inflates.

6. A belt guide for an airbelt, the belt guide mounted to a shoulder portion of a vehicle seat back, comprising:
a guide hole; and
first and second leg members, the leg members being substantially parallel to each other in a vehicle width direction, with a space between the first leg member and the second leg member, and
wherein the belt guide is projected a predetermined length due to inflation of the airbelt, and wherein the guide hole is increased in size in a vehicle vertical direction when the belt is being projected, and wherein the predetermined length of the belt guide is larger than a distance between the first and second leg members in the vehicle width direction.

7. The belt guide according to claim 6, further comprising a stopper, the stopper including a plate member positioned in the vehicle width direction, and wherein the plate member couples together lower ends of the first and second leg members to each other.

8. The belt guide according to claim 6, wherein the belt guide is supported by a guide member mounted in the vehicle seat back, the belt guide being slidable in a direction to which the belt guide is being projected.

9. The belt guide according to claim 6, further comprising a projection restriction mechanism to restrict the projection of the belt guide during inflation of the airbelt.

* * * * *